United States Patent
Goujon et al.

(10) Patent No.: US 10,048,395 B2
(45) Date of Patent: *Aug. 14, 2018

(54) COMPUTING A GRADIENT BASED ON DIFFERENCES OF PLURAL PAIRS OF PARTICLE MOTION SENSORS

(71) Applicant: WESTERNGECO L.L.C., Houston, TX (US)

(72) Inventors: Nicolas Goujon, Oslo (NO); Pascal Edme, Cambridge (GB); Artem Kashubin, East Grinstead (GB); Everhard Johan Muijzert, Oslo (NO); Claudio Bagaini, Asker (NO)

(73) Assignee: WESTERNGECO L.L.C., Houston, TX (US)

( * ) Notice: Subject to any disclaimer, the term of this patent is extended or adjusted under 35 U.S.C. 154(b) by 667 days.

This patent is subject to a terminal disclaimer.

(21) Appl. No.: 14/158,193

(22) Filed: Jan. 17, 2014

(65) Prior Publication Data

US 2014/0219053 A1 Aug. 7, 2014

Related U.S. Application Data

(60) Provisional application No. 61/868,429, filed on Aug. 21, 2013, provisional application No. 61/759,466, filed on Feb. 1, 2013.

(51) Int. Cl.
*G01V 1/18* (2006.01)
*G01V 1/30* (2006.01)
(Continued)

(52) U.S. Cl.
CPC ............... *G01V 1/162* (2013.01); *G01V 1/30* (2013.01); *G01V 1/185* (2013.01); *G01V 13/00* (2013.01); *Y10T 29/49002* (2015.01)

(58) Field of Classification Search
CPC . G01V 1/18; G01V 1/30; G01V 1/162; G01V 13/00; G01V 1/185; Y10T 29/49002
(Continued)

(56) References Cited

U.S. PATENT DOCUMENTS 2,705,314 A 3/1955 Gaby
3,722,751 A 3/1973 Bisciglia
(Continued)

FOREIGN PATENT DOCUMENTS

EP 0457644 A1 11/1991
EP 0736781 A1 10/1996
(Continued)

OTHER PUBLICATIONS

International search report and written opinion for the equivalent PCT patent application No. PCT/US2014/051971 dated Dec. 11, 2014.
(Continued)

*Primary Examiner* — Daniel L Murphy
(74) *Attorney, Agent, or Firm* — Kevin Brayton McGoff

(57) ABSTRACT

A seismic sensor device includes an elongated housing for placement at least partially into an earth surface. A plurality of particle motion sensors are contained in the elongated housing to measure translational data in a first direction, where plural pairs of the particle motion sensors are spaced apart along a second, different direction along a longitudinal axis of the elongated housing. A communication interface communicates the measured translational data to a computer system configured to compute a gradient based on respective differences of the measured translational data of the corresponding plural pairs of the particle motion sensors, and compute one or more of rotation data and divergence data using the gradient.

19 Claims, 5 Drawing Sheets

(51) Int. Cl.
*G01V 1/16* (2006.01)
*G01V 13/00* (2006.01)

(58) Field of Classification Search
USPC .................................................. 367/37, 38
See application file for complete search history.

(56) References Cited

U.S. PATENT DOCUMENTS

| | | | |
|---|---|---|---|
| 3,930,218 | A | 12/1975 | Hall, Jr. |
| 3,934,218 | A | 1/1976 | Babb |
| 4,134,097 | A | 1/1979 | Cowles |
| 4,163,206 | A | 7/1979 | Hall, Jr. |
| 4,300,220 | A | 11/1981 | Goff et al. |
| 4,334,296 | A | 6/1982 | Hall, Jr. |
| 4,520,467 | A | 5/1985 | Bemi |
| 4,554,648 | A | 11/1985 | Greer et al. |
| 4,558,439 | A | 12/1985 | Gudesen |
| 4,599,713 | A | 7/1986 | Rudaz |
| 4,890,264 | A | 12/1989 | Crews |
| 4,979,150 | A | 12/1990 | Barr |
| 4,996,675 | A | 2/1991 | Beauducel |
| 5,010,531 | A | 4/1991 | McNeel |
| 5,124,956 | A | 6/1992 | Rice et al. |
| 5,214,614 | A | 5/1993 | Baule |
| 5,365,491 | A | 11/1994 | Sullivan et al. |
| 5,555,530 | A | 9/1996 | Meehan |
| 5,621,699 | A | 4/1997 | Rigsby et al. |
| 5,648,938 | A | 7/1997 | Jakubowicz |
| 5,757,720 | A | 5/1998 | Soubaras |
| 5,890,264 | A | 4/1999 | Shofner et al. |
| 6,172,940 | B1 | 1/2001 | McConnell et al. |
| 6,288,976 | B1 | 9/2001 | Ambs |
| 6,314,371 | B1 | 11/2001 | Monk |
| 6,330,512 | B1 | 12/2001 | Thomas et al. |
| 6,353,577 | B1 | 3/2002 | Orban et al. |
| 6,381,544 | B1 | 4/2002 | Sallas et al. |
| 6,442,304 | B1 | 8/2002 | Crawley et al. |
| 6,446,009 | B1 | 9/2002 | Baeten |
| 6,584,038 | B2 | 6/2003 | Meunier |
| 6,607,050 | B2 | 8/2003 | He et al. |
| 6,712,141 | B1 | 3/2004 | Bussear et al. |
| 6,791,901 | B1 | 9/2004 | Robertsson et al. |
| 6,814,160 | B1 | 11/2004 | Scott |
| 6,814,179 | B2 | 11/2004 | Corrigan et al. |
| 6,868,356 | B2 | 3/2005 | Nai et al. |
| 6,894,948 | B2 | 5/2005 | Brittan et al. |
| 6,932,185 | B2 | 8/2005 | Bary et al. |
| 6,961,283 | B2 | 11/2005 | Kappius et al. |
| 7,082,079 | B2 | 7/2006 | Woo |
| 7,252,174 | B2* | 8/2007 | Cox ........................ G01V 1/52 181/102 |
| 7,474,591 | B2 | 1/2009 | Menard et al. |
| 7,551,517 | B2 | 6/2009 | Berg et al. |
| 7,656,746 | B2 | 2/2010 | de Kok et al. |
| 7,710,822 | B2* | 5/2010 | Harmon ................... G01V 1/42 367/25 |
| 7,916,576 | B2 | 3/2011 | Beasley et al. |
| 8,199,611 | B2 | 6/2012 | Goujon |
| 8,520,469 | B2 | 8/2013 | Ronnow et al. |
| 8,654,606 | B2 | 2/2014 | Muyzert et al. |
| 8,665,671 | B2 | 3/2014 | Muyzert et al. |
| 8,712,694 | B2 | 4/2014 | Edme et al. |
| 8,755,643 | B2* | 6/2014 | Nash .................. G01D 5/35383 385/12 |
| 9,103,930 | B2 | 8/2015 | Paulson et al. |
| 9,110,187 | B2 | 8/2015 | Muyzert et al. |
| 9,151,857 | B2 | 10/2015 | Manin |
| 9,594,174 | B2 | 3/2017 | Goujon et al. |
| 9,841,519 | B2 | 12/2017 | Rouquette |
| 2004/0257913 | A1 | 12/2004 | Ray et al. |
| 2005/0034917 | A1 | 2/2005 | Mathiszik et al. |
| 2007/0056795 | A1 | 3/2007 | Cox et al. |
| 2007/0104028 | A1 | 5/2007 | van Manen et al. |
| 2007/0265786 | A1 | 11/2007 | Ozdemir et al. |
| 2008/0037369 | A1 | 2/2008 | Hentati |
| 2008/0049551 | A1 | 2/2008 | Muyzert et al. |
| 2008/0225641 | A1 | 9/2008 | Manen et al. |
| 2009/0012711 | A1 | 1/2009 | Harmon |
| 2009/0052277 | A1 | 2/2009 | Swanson |
| 2009/0296529 | A1 | 12/2009 | Boergen et al. |
| 2010/0100330 | A1 | 4/2010 | Burkholder et al. |
| 2010/0195438 | A1 | 8/2010 | Goujon |
| 2010/0195439 | A1 | 8/2010 | Muyzert |
| 2010/0202251 | A1 | 8/2010 | Ozdemir et al. |
| 2010/0225324 | A1 | 9/2010 | Strack et al. |
| 2010/0265797 | A1 | 10/2010 | Robertsson et al. |
| 2010/0286922 | A1 | 11/2010 | Poletto |
| 2010/0302909 | A1 | 12/2010 | Muyzert et al. |
| 2011/0061454 | A1* | 3/2011 | Vornbrock ............... E21B 7/046 73/152.58 |
| 2011/0080808 | A1 | 4/2011 | Muyzert et al. |
| 2011/0082646 | A1 | 4/2011 | Halliday et al. |
| 2011/0082647 | A1 | 4/2011 | Edme et al. |
| 2011/0085417 | A1 | 4/2011 | Ronnow |
| 2011/0085419 | A1 | 4/2011 | Ronnow et al. |
| 2011/0141849 | A1 | 6/2011 | Brittan |
| 2011/0242933 | A1 | 10/2011 | Maissant et al. |
| 2011/0249530 | A1 | 10/2011 | Liu et al. |
| 2012/0026834 | A1 | 2/2012 | Muyzert et al. |
| 2012/0035852 | A1 | 2/2012 | Edme |
| 2012/0081999 | A1 | 4/2012 | Halliday et al. |
| 2012/0113749 | A1 | 5/2012 | Edme et al. |
| 2012/0137781 | A1* | 6/2012 | Hill .......................... F17D 5/06 73/655 |
| 2012/0250460 | A1 | 10/2012 | Edme et al. |
| 2012/0253680 | A1 | 10/2012 | Thompson et al. |
| 2012/0253683 | A1 | 10/2012 | Edme et al. |
| 2012/0269033 | A1 | 10/2012 | Maples et al. |
| 2013/0272091 | A1 | 10/2013 | Yilmaz |
| 2013/0315036 | A1 | 11/2013 | Paulson et al. |
| 2014/0022861 | A1 | 1/2014 | Edme et al. |
| 2014/0219055 | A1 | 8/2014 | Goujon et al. |
| 2016/0025875 | A1* | 1/2016 | Friedly .................. G01V 1/162 367/76 |
| 2016/0334523 | A1 | 11/2016 | Edme |
| 2017/0212259 | A1 | 7/2017 | Degner |
| 2017/0350996 | A1 | 12/2017 | Andersen |

FOREIGN PATENT DOCUMENTS

| | | |
|---|---|---|
| EP | 1257849 A1 | 11/2002 |
| EP | 0932843 B1 | 2/2005 |
| EP | 2293116 | 3/2011 |
| EP | 1454169 B1 | 11/2013 |
| FR | 2738642 A1 | 3/1997 |
| GB | 1256304 A | 12/1971 |
| GB | 2456313 | 5/2010 |
| KR | 201100442276 A | 4/2011 |
| RU | 32290 U1 | 9/2003 |
| WO | 2001/59482 A1 | 8/2001 |
| WO | 2003/036331 A1 | 5/2003 |
| WO | 2005/017563 A1 | 2/2005 |
| WO | 2010048906 | 5/2010 |
| WO | 2010/090949 A2 | 8/2010 |
| WO | 2012015520 A1 | 2/2012 |
| WO | 2013/090544 | 6/2013 |
| WO | 2013150452 | 10/2013 |

OTHER PUBLICATIONS

International Search Report and Written Opinion of PCT Application No. PCT/US2014/013866 dated May 8, 2014.
Anonymous, "428XL Land Seismic Acquisition System," Sercel, 2014: pp. 1-12.
Pham et al., "Investigation of ground rotational motions caused by direct and scattered P-waves from the Mar. 4, 2008 Taiger explosion experiment," Journal of Seismology, Kluwer Academic Publishers, vol. 16, No. 4, Apr. 4, 2012, pp. 709-720.
Barr, "Dual-Sensor OBC Technology," The Leading Edge, Jan. 1997, vol. 16(1), pp. 45-51.

(56) References Cited

OTHER PUBLICATIONS

Barr, et al., "Attenuation of Water-column Reverberations Using Pressure and Velocity Detectors in Water-Bottom Cable," SEG Annual International, Oct. 1989, pp. 653-656.
Criss, "Another look at full-wave seismic imaging," First Break, Jun. 2007, vol. 25, pp. 109-116.
Curtis, et al., "Seismic interferometry—turning noise into signal," The Leading Edge, Sep. 2006, pp. 1082-1092.
De Meersman, et al., "A Complex SVD-Polarization Filter for Ground Roll Attenuation on Multi-Component Data," EAGE 67th Conference and Exhibition, Jun. 2005, pp. 1-4.
Dey, et al., "Noise suppression on geophone data using microphone measurements," CREWES Research Report, 2000, vol. 12, pp. 1-12, retrieved at http://www.crewes.org/ForOurSponsors/ResearchReports/2000/2000-08.pdf.
Drijkoningen, "Design of Seismic Network in LOFAR: Testing at Exloo Test-Site," Jul. 2007, pp. 1-53.
Drijkoningen, et al., "Project Plan of the Seismic Application in LOFAR," Sep. 2007, pp. 1-16.
Edme, et al., "Receiver Function Decomposition of OBC Data: Theory," Geophysical Journal International, 2009, vol. 177(3), pp. 966-977.
Edme, et al., "Receiver Function Method in Reflection Seismology," European Association of Geoscientists & Engineers, Geophysical Prospecting, 2008, vol. 56(3), pp. 327-340.
Greensted, "The Lab Book Pages: Delay Sum Beamforming, An online collection of electronics information," The Lab Book Pages, Oct. 2012, pp. 1-9, retrieved at http://www.labbookpages.co.jk/audio/beamforming/delaySum_html.
Halliday, et al., "Interferometric surface-wave isolation and removal," Geophysics, Sep.-Oct. 2007, vol. 72(5), pp. A69-A73.
ION Geophysical, "Digital Sensors," 2009, retrieved at http://iongeo.com/Land_Imaging/Digital_Sensors.
ION Geophysical, "Sensor Geophones," 2009, retrieved at http://iongeo.com/Land_Imaging/Geophones.
Karsli, et al., "Using the Wiener-Levison Algorithm to Supress Ground Roll," Journal of Applied Geophysics, Mar. 2004, vol. 55 (3-4), pp. 187-197.
Kennett, "Seismic Wave Propagation in Stratified Media," Cambridge University Press, 1983.
Kragh, et al., "Ground Roll and Polarization," First Break, Sep. 1995, vol. 13(9), pp. 369-378.
Robertsson, et al., "Wavefield Separation using Densely Deployed Three-Component Single-Sensor Groups in Land Surface-Seismic Recordings," Geophysicas, Sep. 2002, vol. 67(5), pp. 1624-1633.
Snieder, "Extracting the Green's function of attenuating heterogeneous acoustic media from uncorrelated waves," J. Acoust. Soc. A., May 2007, vol. 121(5), pp. 2637-2643.
Snieder, et al., "Cancellation of spurious arrivals in Green's function extraction and the generalized optical theorem," Physical Review E, 2008, vol. 78, pp. 036606-1-036606-8.
Van Dalen, et al., "G035: Characterization of Subsurface Parameters with Combined Fluid-Pressure and Particle-Velocity Measurement," 70th EAGE Conference & Exhibtion, Jun. 9, 2008, pp. 1-5.
Extended Search Report for the cross referenced European patent application 15177756.2 dated Jan. 5, 2016.
Supplemental Search Report for the cross referenced European patent application 14746018.2 dated Jan. 18 , 2016.
Communication pursuant to Article 94(3) for the cross referenced European patent application 14746018.2 dated Feb. 17, 2016.
Office Action for the cross referenced Russian patent application 2015131023 dated Apr. 19 2016.
Decision on Grant for the cross referenced Russian patent application 2015131023 dated Jul. 21, 2016.
Office Action for the cross referenced Mexican patent application MX/a/2015/008000 dated Aug. 26, 2016.
International Search Report and Written Opinion for the cross referenced International patent application PCT/US2015/011742 dated Apr. 10, 2015.
Examination Report for the cross referenced Australian patent application 2014212354 dated May 2, 2017.
Office Action for the cross referenced GCC patent application GC2014-26355 dated Jun. 3, 2017.
Office Action for the equivalent GCC patent application GC2014-27799 dated Oct. 9, 2017.
Non final office action for the cross referenced U.S. Appl. No. 15/110,986 dated Feb. 22, 2018.

\* cited by examiner

COMPUTING A GRADIENT BASED ON DIFFERENCES OF PLURAL PAIRS OF PARTICLE MOTION SENSORS

CROSS REFERENCE TO RELATED APPLICATIONS

This application claims the benefit under 35 U.S.C. § 119(e) of U.S. Provisional Patent Application Ser. Nos. 61/868,429 filed Aug. 21, 2013; and 61/759,466 filed Feb. 1, 2013; both of which are incorporated herein by reference in their entireties.

BACKGROUND

Seismic surveying is used for identifying subterranean elements of interest, such as hydrocarbon reservoirs, freshwater aquifers, gas injection zones, and so forth. In seismic surveying, seismic sources are activated to generate seismic waves directed into a subterranean structure.

The seismic waves generated by a seismic source travel into the subterranean structure, with a portion of the seismic waves reflected back to the surface for receipt by seismic sensors (e.g., geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor.

SUMMARY

In general, according to some implementations, a seismic sensor device includes an elongated housing for placement at least partially into an earth surface. A plurality of particle motion sensors are contained in the elongated housing to measure translational data in a first direction, where plural pairs of the particle motion sensors are spaced apart along a second, different direction along a longitudinal axis of the elongated housing. A communication interface communicates the measured translational data to a computer system configured to compute a gradient based on respective differences of the measured translational data of the corresponding plural pairs of the particle motion sensors, and compute one or more of rotation data and divergence data using the gradient.

Other features will become apparent from the following description, from the drawings, and from the claims.

BRIEF DESCRIPTION OF THE DRAWINGS

Some embodiments are described with respect to the following figures.

DETAILED DESCRIPTION

Figure 1:
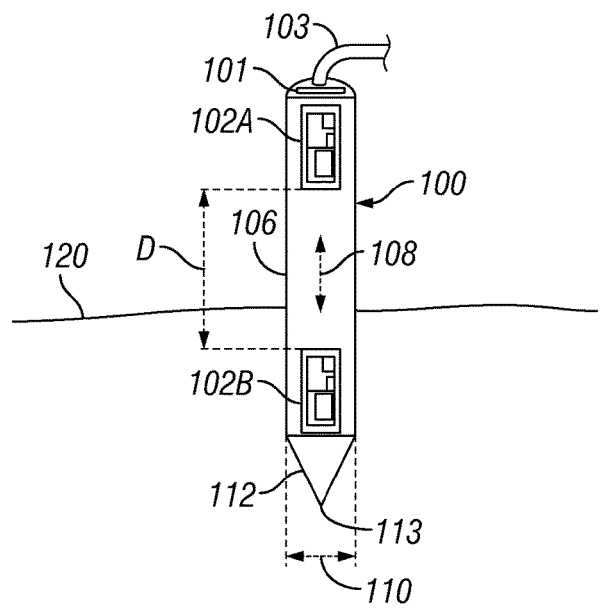
FIG. 1 is a schematic diagram of a sensor device according to some implementations.

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors, or any other type of sensors that measure translational motion of the surface in one or more directions. In the ensuing discussion, a seismic sensor that measures translational motion is referred to as a particle motion sensor. A particle motion sensor can refer to any of the sensors listed above.

An arrangement of particle motion sensors can be provided at (or proximate) a ground surface or earth surface (land surface or bottom surface of a body of water, such as a seafloor) to measure seismic waves reflected from a subterranean structure, in response to seismic waves (or impulses) produced by one or more seismic sources and propagated into an earth subsurface. A particle motion sensor provided at (or proximate) a ground surface can refer to a particle motion sensor that is placed in contact with the ground surface, partially buried in the ground surface, or completely buried in the ground surface up to a predetermined depth (e.g., up to a depth of less than 5 meters). A particle motion sensor at (or proximate) the earth surface can record the vectorial part of an elastic wavefield just below the free surface (i.e., ground surface).

In addition to measuring translational data, it may be useful to obtain rotation data when performing survey data acquisition for various purposes. For example, rotation data can be combined with translational data measured by particle motion sensors to eliminate or attenuate noise from the measured translational data. Examples of noise include ground-roll noise or another type of noise (such as ambient noise) that can travel along the earth's surface. Ground-roll noise can be produced by a seismic source or other source, such as cars, engines, pumps, and natural phenomena such as wind and ocean waves. The ground-roll noise travels generally horizontally along an earth surface towards seismic receivers. The horizontally traveling seismic waves, such as Rayleigh waves or Love waves, are undesirable components that can contaminate seismic survey data.

Although reference is made to using rotation data to attenuate noise, it is noted that rotation data can be used for other purposes, whether in the context of a land-based survey acquisition or marine-based survey acquisition in which a seabed cable or other arrangement of seismic sensors is placed on the seafloor. For example, rotation data and translational data can be used in performing various seismic data processing algorithms, including, among others, wavefield interpolation, wavefield extrapolation, wavefield reconstruction, wavefield regularization, P- and S-wave separation, apparent velocity estimation, near-surface characterization, seismic sensor calibration, and seismic imaging.

Wavefield interpolation refers to estimating (interpolating) wavefields at locations where seismic sensors are not provided. P- and S-wave separation refers to separating compressional (P) waves from shear (S) waves in measured seismic survey data. Apparent velocity estimation refers to estimating a characteristic of the seismic wavefield known as ray parameter or horizontal slowness, from which seismic wave velocities at various points in a subterranean structure can be retrieved. Near-surface characterization refers to estimating the shallow earth elastic properties. Seismic sensor calibration refers to calibrating a seismic sensor to compensate for any non-ideal characteristic of the seismic sensor.

Rotation data refers to a rate of rotation (or change in rotation over time) about a specific axis, such as about the x axis (which can also be referred to as a horizontal inline axis) and/or about the y axis (which can also be referred to as a horizontal crossline axis). In accordance with some implementations, rotation data can be derived based on translational data measured by particle motion sensors. In this way, a separate rotational sensor would not have to be provided in survey equipment for the purpose of measuring rotation data.

FIG. 1 depicts an example seismic sensor device 100 that includes a first sensor component 102A and a second sensor component 102B. The sensor components 102A and 102B are included inside a single housing 106 of the sensor device 100. The seismic sensor device 100 can also include a power source, such as a battery, a solar cell, and so forth. In manufacturing the seismic sensor device 100, the housing 106 can be sealed to protect the sensor components 102A and 102B.

The housing 106 generally has an elongated shape that allows the sensor components 102A and 102B to be spaced apart along a longitudinal axis 108, by a distance D, of the sensor device 100. In some implementations, the sensor components 102A and 102B are co-axial along the longitudinal axis of the housing 106. The elongated housing 106 can be in the form of a hollow tube, stick, or other elongated structure. The longitudinal axis 108 is the axis along a dimension of the sensor device 100 which is longer than other dimensions of the sensor device 100, such as a width dimension 110 or a depth dimension (not shown) that corresponds to a thickness of the housing 106.

The sensor device 100 having the elongated housing 106 can be referred to as a spike-shaped sensor device.

The housing 106 can be made out of a material, such as plastic, metal, and so forth. According to an example embodiment, the housing 106 may not resonate within a bandwidth of interest for target signals to be measured. In some examples, the bandwidth of interest can be in the range between 1 to 250 Hertz (Hz). In other examples, the housing 106 may exhibit resonance; in such examples, the resonance can be removed by processing, or the resonance can be compensated for by processing.

By arranging the sensor components 102A and 102B in the elongated housing 106 as shown in FIG. 1, the sensor components 102A and 102B are spaced apart along just the longitudinal axis 108. In other words, in some implementations, the sensor device 100 does not include sensor components that are spaced apart in any other direction (other than a direction parallel to the longitudinal axis).

FIG. 1 shows a portion of the sensor device 100 (not to scale) being below the ground surface 120, and a portion of the sensor device 100 being above the ground surface 120. According to an embodiment, the configuration can include a sensor 102B below the ground surface and a sensor 102A above the ground surface. A sensor can also be positioned at or proximate the ground surface 120. According to an embodiment, a majority of the sensor device 100 can be below the ground surface 120. According to another embodiment a majority of the sensor device 100 can be above the ground surface 120. Another embodiment can have approximately half the sensor device 100 above and half the sensor device 100 below the ground surface 120.

In some examples, to obtain rotation data with respect to a horizontal axis at a ground surface 120, two vertically spaced horizontal orientated particle motion sensors can be provided in the sensor device 100. The sensor device 100 can then be vertically arranged at or near the ground surface 120. It should be understood that additional sensors to 102A and 102B can be located along the length of the sensor device 100 to provide redundancy for failed sensors and/or additional measurements.

The sensor device 100 can include a communication interface circuit 101, which is connected to a communications medium 103 (e.g., electrical cable, fiber optic cable, etc.). The communications medium 103 can be a wireless medium over which data can be communicated. The communication interface circuit 101 is connected to the sensor components 102A and 102B. Data acquired by the sensor components 102A and 102B are transferred to the communication interface circuit 101, such as over an electrical, optical, or wireless link. The communication interface circuit 101 in turn transmits the acquired data over the communications medium 103 to a remote station, which can be a recording station, a computer, and so forth. According to other embodiments, a memory can be provided and incorporated with the sensor device 100. The memory can also be separate from the sensor device 100 and connected by wire, or short range wireless technology such as Wi-Fi or Bluetooth. An arrangement where memory is included can be referred to in the commercial art as a "blind" node arrangement. In this "blind" node arrangement, a communications interface circuit 101 may not have to be present. It should also be appreciated that a combination of a "blind" node arrangement and a wired node and a wireless node arrangement can be used.

In further implementations, the sensor device 100 may contain a sensing element (or sensing elements) to measure a tilt and/or an azimuth of the sensor device 100, where tilt is measured with respect to the z axis. This sensing element(s) can be part of the sensor components 102A and 102B that measure translation and rotation. For example, if the sensor components 102A and 102B include MEMS accelerometers that measure down to DC, then the MEMS accelerometers can provide tilt data. If the sensor components 102A and 102B include geophones, then a tilt meter can be added. An azimuth sensor (e.g., magnetometer, compass) can be added, so that measured horizontal components (e.g., translational data or rotation data in the x or y axis) can be rotated with respect to a global reference. If an azimuth sensor is not provided, then the sensor device 100 can be oriented azimuthally to a predefined azimuth when the sensor device 100 is planted.

Also, control circuitry (not shown) can be included in the sensor device 100 to control the particle motion sensors. Additionally, an analog-to-digital converter and other components may be included, such as in the communication interface circuit 101, to convert signals measured by the particle motions sensors into digital form. The components in the sensor device 100 may be powered by a battery, a solar panel, or through a wired or wireless connection.

The bottom portion of the sensor device 100 may include a spike 112 for driving the sensor device 100 into the ground surface 120. The spike 112 has a generally sharp tip 113 that allows for easier insertion of the sensor device 100 into the ground surface 120 to form a connection between the earth and the sensor device 100. A user or machine can push the spike 112 into the ground surface 120 to cause at least a portion of the sensor device 100 to be buried in the earth beneath the ground surface 120. For example, the sensor device 100 can be driven into the ground surface using a hammer, either by a user or in an automated manner by a machine. In different examples, the sensor device 100 can be screwed into the ground by a wrench or planted in a prepared borehole with reduced disturbance of the surrounding earth. As another example, a borehole may be dug and the sensor device 100 may be placed therein. The borehole may be refilled after positioning the sensor device 100. Instead of using the spike 112, the housing 106 of the sensor device 100 can have a V or screw shape to facilitate planting into the ground surface 120 (protrusions can be formed on the outer wall of the housing 106 in the form of a helical screw).

In some cases, the sensor device 100 is partially buried beneath the ground surface 120, with a portion of the sensor device 100 protruding above the ground surface 120. In other cases, the sensor device 100 can be completely buried in the ground surface, up to a predetermined depth (as discussed above).

Although FIG. 1 shows the seismic sensor device 100 being arranged vertically, it is noted that in alternative examples, the seismic sensor device 100 can be arranged horizontally (in other words, the seismic sensor device 100 lies on its side).

In some examples, the sensor components 102A and 102B are sensor chips. A sensor chip refers to an integrated circuit device that includes a substrate (e.g., semiconductor substrate) on which particle motion sensors can be provided. For example, the particle motion sensors that can be provided in the sensor chip 102A or 102B can include MEMS particle motion sensors, such as MEMS accelerometers. A MEMS particle motion sensor can include a micro element (e.g., a micro cantilever) that is moveable in response to particle motion, where the movement of the micro element can be detected by a sensing element. In other examples, the sensor components 102A and 102B can include other types of particle motion sensors. It should be noted that the MEMS particle motion sensors do not have to be on the "chip," but that is an option. An example of a MEMS and electronics configuration is disclosed in U.S. Patent Application Publication No. 2013/0315036.

Figure 2A:
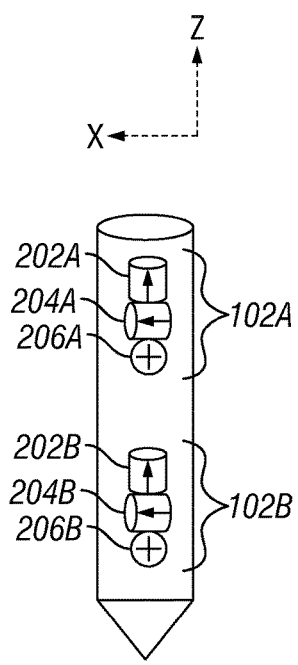
FIGS. 2A-2C are schematic diagrams of a sensor device according to various implementations.
Figure 2B:
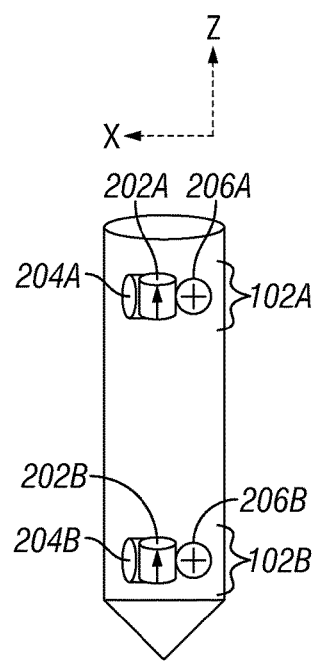

In some implementations, the particle motion sensors that are provided in the sensor component 102A or 102B can measure translational data in multiple directions, such as the x, y and z directions. Examples of such arrangements are shown in FIGS. 2A and 2B, where the sensor component 102A or 102B includes a respective z sensor 202A or 202B (for measuring translational data along the z axis), a respective x sensor 204A or 204B (for measuring translational data along the x axis), and a respective y sensor 206A or 206B (for measuring translational data along they axis).

Figure 2C:
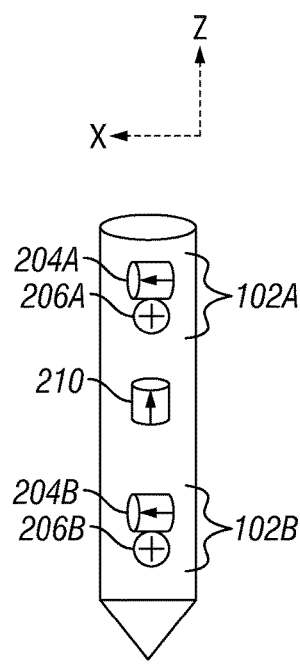

In further examples, such as shown in FIG. 2C, the sensor component 102A or 102B can include just a respective x sensor 204A or 204B and a respective y sensor 206A or 206B. In the arrangement of FIG. 2C, a separate z sensor 210 can be provided for measuring translational data along the z direction. The z sensor 210 can be positioned in the middle between sensor components 102A and 102B. In other examples, the z sensor 210 can be positioned elsewhere, such as in either 102A or 102B. In some implementations, a pair of sensors (e.g., 204A and 204B, or 206A and 206B, or 202A and 202B) can be hardwired together to provide the sum and the difference as outputs. The sum can help reduce the non-correlated noise (between the elements of a pair) and the difference provides a gradient.

In other implementations, the sensor component 102A can include particle motion sensors to measure in the x, y, and z axes, while the sensor component 102B can include particle motion sensors to measure in just the x and y axes.

Note that the particle motion sensors in a given component (e.g., 102A) within the same sensor device 100 do not have to be orientated in the same direction as the other sensor component (e.g., 102B). If the relative angle between the sensor components 102A and 102B is known, then the measured data by the pair of particle motion sensors can be corrected using vector rotation.

The rotation data in the three spatial axes (k=x, y, z) is given by:

$$R_k = \frac{1}{2}\left[\frac{\partial v_i}{\partial j} - \frac{\partial v_j}{\partial i}\right], \quad \text{(Eq. 1)}$$

where $v_i$ represents the particle velocity along the i (i=x, y, z) axis, and $v_j$ represents particle velocity along the j (j=x, y, z) axis. In the foregoing nomenclature, the i axis is orthogonal with respect to the j axis, and both the i and j axes are orthogonal with respect to the k axis. The gradient $$\frac{\partial v_i}{\partial j}$$

represents a spatial derivative of $v_i$ with respect to the j axis, and the gradient $$\frac{\partial v_j}{\partial i}$$

represents a spatial derivative of $v_j$ with respect to the i axis. The particle velocity measurements can be made at or just under the ground surface 120 (FIG. 1). At or just under the ground surface 120, the following relationships for deriving rotation data along the x and y axis may apply:

$$R_y = -\frac{\partial v_z}{\partial x} = +\frac{\partial v_x}{\partial z}, \quad \text{(Eq. 2)}$$

$$R_x = \frac{\partial v_z}{\partial y} = -\frac{\partial v_y}{\partial z}, \quad \text{(Eq. 3)}$$

where $v_x$ represents particle velocity along the x direction, $v_y$ represents particle velocity along the y direction, and $v_z$ represents particle velocity along the z direction. This implies that the rotation components around a horizontal axis, $R_y$ or $R_x$, can be derived by measuring just one of the terms in the right hand side of Eq. 2 or 3.

Although reference is made to deriving rotation data based on measured velocities in the foregoing examples, it is noted that other types of translational data, including displacement or acceleration data, can be used for obtaining rotation data in a manner similar to that described in connection with Eqs. 2 and 3 above.

A characteristic of providing the sensor device 100 at the ground surface 120 (or free surface between the air and a solid or between the water and a solid) is that a spatial gradient and rotation become equivalent to one another, as expressed by Eq. 2 or 3.

By taking advantage of such characteristic when the sensor device is provided at the ground surface 120, measurements of the vertical gradient of horizontal translational data in a spike-shaped sensor device can be used to obtain the rotation data. A vertical gradient refers to a gradient taken with respect to the z axis. Horizontal translation data refers to translational data along the x or y axis. The vertical gradient of horizontal translational data can be expressed as $$\frac{\delta v_x}{\delta z} \text{ or } \frac{\delta v_y}{\delta z},$$

for example.

In the example arrangement of FIG. 1, the foregoing vertical gradients of horizontal translational data can be obtained using measurements of closely spaced apart x sensors 204A and 204B, or closely spaced apart y sensors 206A and 206B.

In addition to obtaining rotation data using measurements of translational data by particle motion sensors, divergence data can also be derived using the translational data, in accordance with further implementations.

The divergence of a wavefield, $\nabla \cdot V$, can be represented as:

$$\nabla \cdot V = \sum_{i=1}^{3} \frac{\partial v_i}{\partial i}. \quad \text{(Eq. 4)}$$

In Eq. 4, i=(x,y,z) represent the three orthogonal axes. At the free surface, Eq. 4 is expressed as:

$$\nabla \cdot V = \frac{2\mu}{\lambda + 2\mu}\left(\frac{\partial v_x}{\partial x} + \frac{\partial v_y}{\partial y}\right) = -\frac{2\mu}{\lambda}\left(\frac{\partial v_z}{\partial z}\right), \quad \text{(Eq. 5)}$$

Eq. 5 indicates that, at the free surface, the divergence of a wavefield can be measured by just one partial derivative term $$\left(\frac{\partial v_z}{\partial z}\right).$$

In Eq. 5, the parameters $\mu$ and $\lambda$ are Lamé parameters. The ratio of the Lamé parameters $\mu$ and $\lambda$ is a function of the near-surface P- and S-wave velocities $\alpha$ and $\beta$:

$$\frac{\mu}{\lambda} = \frac{\beta^2}{\alpha^2 + \beta^2}. \quad \text{(Eq. 6)}$$

The partial derivative in the right-hand side of Eqs. 2, 3 and 5 can be measured by differentiating measurements from closely spaced apart particle motion sensors, such as closely spaced apart particle motion sensors depicted in FIG. 1. In some examples, the particle motion sensors are spaced apart along the longitudinal axis 108 by a distance D that is less than or equal to about 0.3 times a wavelength of a target signal for measurement by the sensor device 100. In further examples, the particle motion sensors are spaced apart along the longitudinal axis 108 by a distance D that is less than or equal to about 0.1 times a wavelength of a target signal for measurement by the sensor device 100. Note that the foregoing distances D between the particle motion sensors are applicable to computing the rotation data according to Eqs. 2 and 3 and/or the divergence data according to Eq. 5.

To achieve greater accuracy in computing rotation data and/or divergence data as discussed above based on measured translational data, the particle motion sensors are selected or configured such that the impulse responses of the particle motions sensors within the same sensor device 100 are similar to one other to within a specified threshold difference of one other. This may be achieved by selecting matching pairs of particle motion sensors, or by applying calibration coefficients to measurement data acquired by the particle motion sensors.

In some cases, wavelengths of signals in seismic exploration may be much larger than the spacing between particle motion sensors within a sensor device (such as sensor device 100). As a result, a vertical gradient (computed with respect to the z axis) of a horizontal wavefield may not be accurate. The computation of the vertical gradient may be affected by factors such as different sensitivities of the particle motion sensors, electronic noise, and vibrations that affect the particle motion sensors.

The different particle motion sensors may be affected differently by vibrations caused by the surrounding mechanical elements of a sensor device. The effect of these perturbations may not be negligible because the difference of the measured signals is expected to be relatively small with respect to the signals themselves. For example, for a dominant frequency of 20 hertz (Hz) and a phase apparent velocity of 1000 meters per second, the signal wavelength is 50 meters. In other examples, other signal wavelengths are possible.

In accordance with some implementations, one or more additional sensor components (in addition to those shown in FIGS. 1 and 2A-2C, for example) can be provided in the housing of a seismic sensor device. Combining the measurements of the one or more additional sensor components with the other sensor components, as described further below, can reduce the detrimental effects of perturbations and additive noise on the gradient computed using techniques or mechanisms according to some implementations.

In some cases, providing the additional sensor components in a seismic sensor device may not add too much to the telemetry load relating to communications between the seismic sensor device and another system, since measurements can be combined at the seismic sensor device prior to communicating to the other system. For example, compression can be applied to differences of measured signals as computed at the seismic sensor device, and the compressed differences can be transmitted.

In the ensuing discussion, the vertical gradient $$\frac{\partial v_x}{\partial z}$$

of the x translational data with respect to the z axis can be represented as $g_{\bar{x}z}$. Similarly, the vertical gradient $$\frac{\partial v_y}{\partial z}$$

of the y translational data with respect to the z axis can be represented as $g_{\bar{y}z}$.

The vertical gradient of the x translational data can be approximated (with an accuracy to $O(L)^2$) with Eq. 7:

$$\tilde{g}_{xz}(L/2) = \frac{u_x(L) + n(L) - u_x(0) - n(0)}{L}, \quad \text{(Eq. 7)}$$

where L is the vertical distance between sensor components (e.g., shown as D in FIG. 1 between sensor components 102A and 102B), $u_x(z)$ is the actual horizontal ground displacement at depth z, and n(z) is the additive noise that takes into account that the actual displacements are different than the measured displacements. The measured displacement at the sensor component 102A is $u_x(0)+n(0)$, while the measured displacement at the sensor component 102B is $u_x(L)+n(L)$. For simplicity, in Eq. 7, the depth of the shallowest sensor component (e.g., 102A in FIG. 1) is 0, but this can be generalized in other examples, in which case $u_x(0)$ and n(0) in Eq. 7 can be replaced with $u_x(d_0)$ and $n(d_0)$ (where $d_0$ is the depth of the shallowest sensor component), and $u_x(L)$ and n(L) in Eq. 7 can be replaced with $u_x(L+d_0)$ and $n(L+d_0)$. If the additive noise at the two sensor component locations is uncorrelated, the determination of the variance of the estimated gradient is straightforward. The assumption of uncorrelated noise is valid for the electronic noise. In this context, surface waves and source uncorrelated seismic energy are considered signals. If the variance of the additive noise is equal to $\sigma_n$ at a given depth for a respective sensor component, the variance of the estimated gradient is:

$$\sigma^2_{g_{xz}} = \frac{2\sigma_n^2}{L^2}. \quad \text{(Eq. 8)}$$

Eq. 8 highlights how a reduced distance between sensor components can boost the noise.

Figure 3:
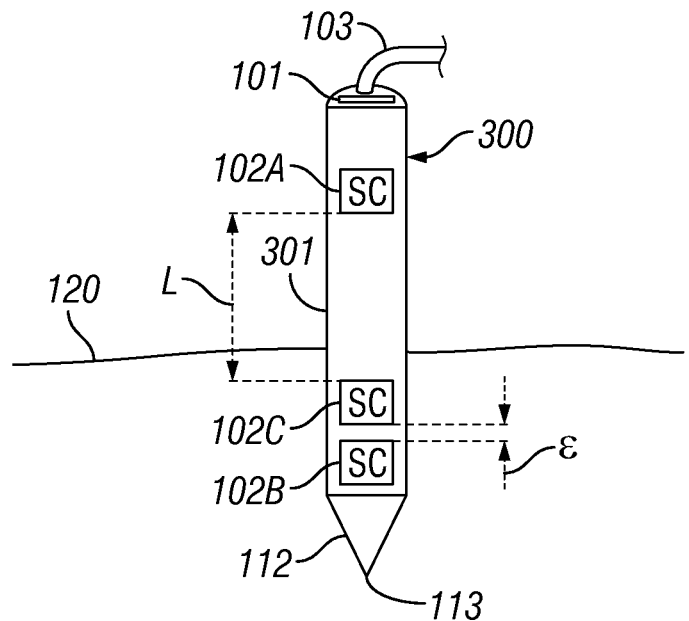
FIGS. 3 and 4 are schematic diagrams of sensor devices according to further implementations.

To address the foregoing issue, FIG. 3 shows a sensor device 300 according to further implementations, in which an additional sensor component 102C has been added in a housing 301 of the sensor device 300, in addition to the sensor components 102A and 102B that are also contained within the housing 301. Elements of the sensor device 300 that are similar to elements of the sensor device 100 are assigned the same reference numerals. The sensor device 300 can be considered to be an "augmented" sensor device, since it includes additional sensor component(s) than arrangements depicted in FIGS. 1 and 2A-2C. Like the sensor components 102A and 102B, the sensor component 102C can include particle motion sensors for measuring translational data in multiple directions, including at least the horizontal directions (x and y), and possibly also the vertical direction (z direction).

The additional sensor component 102C is at a distance ϵ (which can be a relatively small distance) above the sensor component 102B. In accordance with some implementations, with the presence of the additional sensor component 102C, the computation of the vertical gradient $g_{\tilde{x}z}$ can be modified and is performed according to Eq. 9 below.

$$\tilde{g}_{xz}(L/2) = 0.5 \left[ \frac{u_x(L) + n(L) - u_x(0) - n(0)}{L} + \frac{u_x(L-\varepsilon) + n(L-\varepsilon) - u_x(0) - n(0)}{L-\varepsilon} \right], \quad \text{(Eq. 9)}$$

$$= \frac{1}{2L}[-2u_x(0) + u_x(L) + u_x(L-\varepsilon)]$$

whose variance is $$\sigma^2_{g_{xz}} = \frac{3\sigma_n^2}{2L^2}. \quad \text{(Eq. 10)}$$

The variance (represented by Eq. 10) of the vertical gradient computed according to Eq. 9 is less than the variance (represented by Eq. 8) of the vertical gradient computed according to Eq. 7.

In Eq. 9, $u_x(L-\epsilon)$ is the actual horizontal ground displacement at the vertical depth $(L-\epsilon)$ corresponding to the sensor component 102C, and $n(L-\epsilon)$ is the additive noise at the vertical depth $(L-\epsilon)$.

In Eq. 9, a first gradient is computed based on the translational data measured by a first pair of sensor components (102A, 102B), and a second gradient is computed based on the translational data measured by a second pair of the sensor components (102A, 102C). The gradient $g_{\tilde{x}z}$ is an aggregate (e.g., average) of the first and second gradients.

In some examples, the vertical distance or spacing between sensor components 102A and 102C is different from the vertical distance between sensor components 102C and 102B. In other examples, the vertical distance between sensor components 102A and 102C is the same as the vertical distance between sensor components 102C and 102B.

Figure 4:
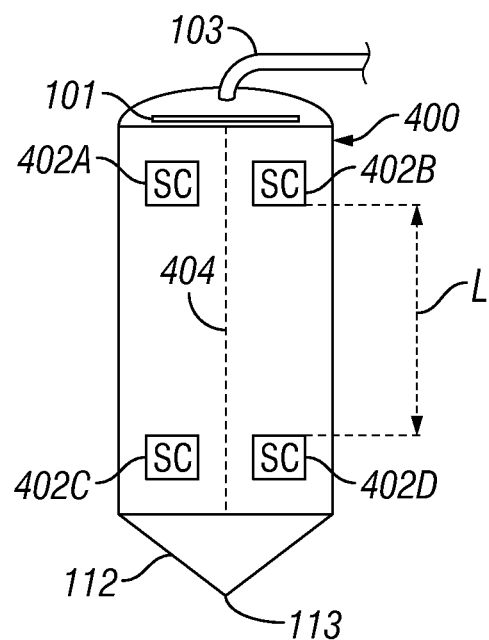

In further implementations, as shown in FIG. 4, another augmented sensor device 400 including a different arrangement of sensor components can be used. Elements of the sensor device 400 that are similar to elements of the sensor device 100 are assigned the same reference numerals. The sensor device 400 includes four sensor components 402A, 402B, 402C, and 402D within an elongated housing 401 of the sensor device 400. The sensor components 402A-402D can include similar arrangements of particle motion sensors as depicted for sensor components 102A and 102B in FIGS. 2A-2C, in some examples.

In the sensor device 400, a center longitudinal axis of the sensor device 400 is represented as 404. The sensor components 402A and 402B are at the same depth, and are placed on either side of the center longitudinal axis 404. The sensor component 402A is on the left of the center longitudinal axis 404, and the sensor component 402A is offset from the center longitudinal axis 404 by $-\Delta x$. The sensor component 402B is on the right of the center longitudinal axis 404, and the sensor component 402B is offset from the center longitudinal axis 404 by $+\Delta x$.

Similarly, the sensor components 402C and 402D are at the same depth (a different depth than the depth of the sensor components 402A and 402B), and the sensor components 402C and 402D are placed on either side of the center longitudinal axis 404. The sensor component 402C is on the left of the center longitudinal axis 404, and the sensor component 402C is offset from the center longitudinal axis 404 by $-\Delta x$. The sensor component 402D is on the right of the center longitudinal axis 404, and the sensor component 402D is offset from the center longitudinal axis 404 by $+\Delta x$.

In some examples, the value of $\Delta x$ is much smaller than the vertical spacing L between the sensor components 402A, B and sensor components 402C, D. For example the value of $\Delta x$ can be less than 10% of L.

Using the arrangement of FIG. 4, the vertical gradient $g_{\tilde{x}z}$ can be computed as follows (in which the depth of the sensor components 402A, B is assumed to be 0, and the terms relating to the additive noise have been omitted for simplicity):

$$g_{\tilde{x}z}(L/2) = \quad \text{(Eq. 11)}$$
$$0.25\left[\frac{u_x(L,\Delta x)-u_x(0,\Delta x)}{L}+\frac{u_x(L,\Delta x)-u_x(0,-\Delta x)}{L}+\right.$$
$$\left.\frac{u_x(L,-\Delta x)-u_x(0,\Delta x)}{L}+\frac{u_x(L,-\Delta x)-u_x(0,-\Delta x)}{L}\right].$$

In Eq. 11, four estimates of the gradient are obtained from the four possible pairs of sensor components and averaged (by multiplying by 0.25). The four possible pairs of sensor components include: (402B, 402D), (402A, 402D), (402B, 402C), and (402A, 402C). The variance for the vertical gradient $g_{\tilde{x}z}$ computed according to Eq. 11 is represented below:

$$\sigma^2_{g_{xz}} = \frac{16\sigma^2_n}{16L^2} = \frac{\sigma^2_n}{L^2}, \quad \text{(Eq. 12)}$$

which is less than the variance represented in Eq. 8 above. More generally, for a sensor device having a general number M of sensors M, the variance can be computed as:

$$\sigma^2_{g_{xz}} = \frac{4}{M}\frac{\sigma^2_n}{L^2}, \text{ for } M \text{ even} \quad \text{(Eq. 13)}$$
$$= \frac{4M}{M^2-1}\frac{\sigma^2_n}{L^2}, \text{ for } M \text{ odd}.$$

In other implementations, if a statistic of the additive noise does not depend on the particle motion sensors, the same variance of Eq. 12 for the sensor device 400 of FIG. 4 can be obtained by first summing the measured translational data recorded at each depth before performing a gradient computation by taking a difference of the sums. Thus, with the arrangement of the sensor device 400 of FIG. 4, the measured translational data of the sensor components 402A and 402B can be summed (or otherwise aggregated), and the measured translational data of the sensor components 402C and 402D can be summed (or otherwise aggregated). Then the gradient can be computed based on a difference of the sums divided by the distance (L) between the sensor component pairs.

A benefit of having at least four measurements and four possible gradient estimates (from respective pairs of sensor components) arises in the presence of different noise statistics and outliers. In this case, the gradient with minimum variance is determined as the weighted least square solution of the system equations (using the notation for the sensor components in FIG. 4):

$$W\begin{bmatrix}1\\1\\1\\1\end{bmatrix}g_{zx} = W\begin{bmatrix}\frac{u_x(D)-u_x(A)}{L}\\\frac{u_x(D)-u_x(B)}{L}\\\frac{u_x(C)-u_x(A)}{L}\\\frac{u_x(C)-u_x(B)}{L}\end{bmatrix}. \quad \text{(Eq. 14)}$$

In Eq. 14, A, B, C and D represent the locations of the sensor components 402A, 402B, 402C and 402D, respectively. Also, W is a weighting matrix (which can be based on a noise covariance matrix that represents the noise experienced by the sensor device 400), $u_x$ is a vector of the measured translational data, and W is multiplied by an identity (I) made up of "1"s. The gradient $g_{\tilde{x}z}$ can be computed according to Eq. 15:

$$g_{zx}=(I*WI)^{-1}I*Wu_x. \quad \text{(Eq. 15)}$$

The weighting matrix W is the inverse of the noise covariance matrix N. If the noise statistics at the sensor components are uncorrelated, N is diagonal. The elements of the noise covariance matrix can be constant, frequency-dependent or (in the case of non-stationary) time-frequency dependent. The estimation of the noise covariance matrix can be carried out using time windows extracted when the seismic sources are activated.

In the foregoing discussion of Eqs. 9-15, reference has been made to computing the vertical gradient $g_{\tilde{x}z}$ of translational data in the x direction, with respect to the z direction. In other implementations, a vertical gradient $g_{\tilde{y}z}$ of translational data in the y direction, with respect to the z direction, can be computed in similar fashion.

Figure 5:
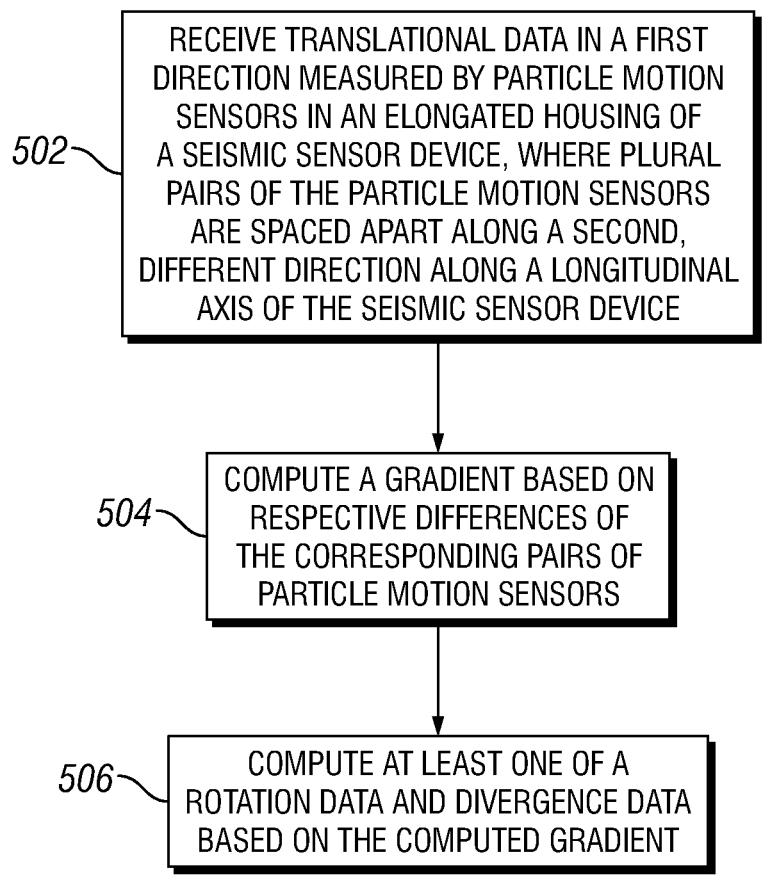
FIG. 5 is a flow diagram of a process according to some implementations.

FIG. 5 is a flow diagram of a process according to some implementations. The process receives (at 502) translational data in a first direction (e.g., x or y direction) measured by particle motion sensors contained in an elongated housing of a seismic sensor device (e.g., 300 or 400) provided proximate the earth surface. Plural pairs of the particle motion sensors are spaced apart along a second, different direction (e.g., z direction) along a longitudinal axis of the elongated housing of the seismic sensor device. In FIG. 3, the plural pairs of sensors can include a first pair of sensor components 102A and 102B, and a second pair of sensor components 102A and 102C. In FIG. 4, the plural pairs of sensors can include the following pairs of sensor components: (402B, 402D), (402A, 402D), (402B, 402C), and (402A, 402C).

The process computes (at 504) a gradient based on respective differences of the corresponding plural pairs of particle motions sensors. The process then computes (at 506) at least one of a rotation data and divergence data based on the computed gradient, such as according to Eqs. 2, 3, and 5.

The estimation of a gradient may also be affected by perturbations due to the vibration of the sensor housing containing the sensor components, and different sensitivities of the sensor components. These perturbations can be approximated with (frequency- and depth-dependent) multiplicative factors. A model of a two-sensor gradient estimation is:

$$g_{\tilde{x}z}(L/2) = \frac{(1-\varphi(L))u_x(L)-(1-\varphi(0))u_x(0)}{L}. \quad \text{(Eq. 16)}$$

where $\varphi$ is the amplitude perturbation due to vibration of the sensor housing containing the sensor components, and different sensitivities of the sensor components. The amplitude perturbation $\varphi$ is a zero mean random variable. If the variance of the perturbations does not vary with depth, the variance of the gradient estimation becomes:

$$\sigma^2_{g_{xz}} = \frac{\sigma^2_\varphi}{L^2}(u^2_x(L)+u^2_x(0)). \quad \text{(Eq. 17)}$$

The augmented sensor device configurations discussed above (such as those shown in FIG. 3 or 4) can reduce the variance of the estimated gradient in the presence of amplitude perturbations. The representation of perturbations with statistics that do not depend on deployment depth may be used for modeling the different sensitivities of the sensor components. Other perturbations, such as those due to rocking motion of the sensor device, may be represented using a different model that depends on the size of the augmented sensor device, the weight distribution of the augmented sensor device, and the frequency of the measured wavefield. If the augmented sensor device rotates about a fulcrum (e.g., 113 shown in FIG. 3 or 4) located at the bottom of the augmented sensor device, the amplitude perturbations increase for shallower sensor deployments. This perturbation increase can be taken into account by modeling the amplitude perturbation with a zero-mean random variable whose variance varies with depth as:

$$\sigma_{\varphi z}^2 = \left(\frac{L-z}{L}\right)^p \sigma_{\varphi 0}^2. \quad \text{(Eq. 18)}$$

where $\sigma_{\varphi 0}$ is the standard deviation of the amplitude perturbation at depth z=0. The variance of the gradient estimate if the shallowest sensor is located at depth z is:

$$\sigma_{g_{xz}}^2 = E[(g_{xz} - E[g_{xz}])^2] = \frac{u_x^2(z)}{(L-z)^2}\left(\frac{L-z}{L}\right)^p \sigma_{\varphi 0}^2. \quad \text{(Eq. 19)}$$

For p≤2, the dominant term is still the distance between sensors and the optimal location for the shallowest sensor is still z=0. For p>2, the rocking motion becomes the dominant factor and the minimization of the rocking requires the shallowest sensor to be away from the surface. If the amplitude perturbations and the additive noise are combined, the variance of the estimated gradient becomes:

$$\sigma_{g_{xz}}^2 = E[(g_{xz} - E[g_{xz}])^2] = \frac{2}{(L-z)^2}\sigma_n^2 + \frac{u_x^2(z)}{(L-z)^2}\left(\frac{L-z}{L}\right)^p \sigma_{\varphi 0}^2. \quad \text{(Eq. 20)}$$

Eq. 20 implies that in the case of signals with smaller amplitudes, the dominant term is the additive noise and its variance. The shallowest sensor component can therefore be located as close as possible to the surface (e.g., less than or equal to a depth of 1 centimeter (cm), for example). However, for larger amplitude signals and a strong rocking motion of the augmented seismic sensor device, the shallower sensor component can be located at an intermediate location (e.g., between a depth of 1 and 20 cm, for example). The frequency also plays a role in the optimal location of the sensor components. Higher frequencies generate higher angular acceleration. If sensor components for different frequency ranges are used, the lower frequency sensor component can be located closer to the earth surface, whereas the higher frequency sensor components can be located at an intermediate depth.

Figure 6:
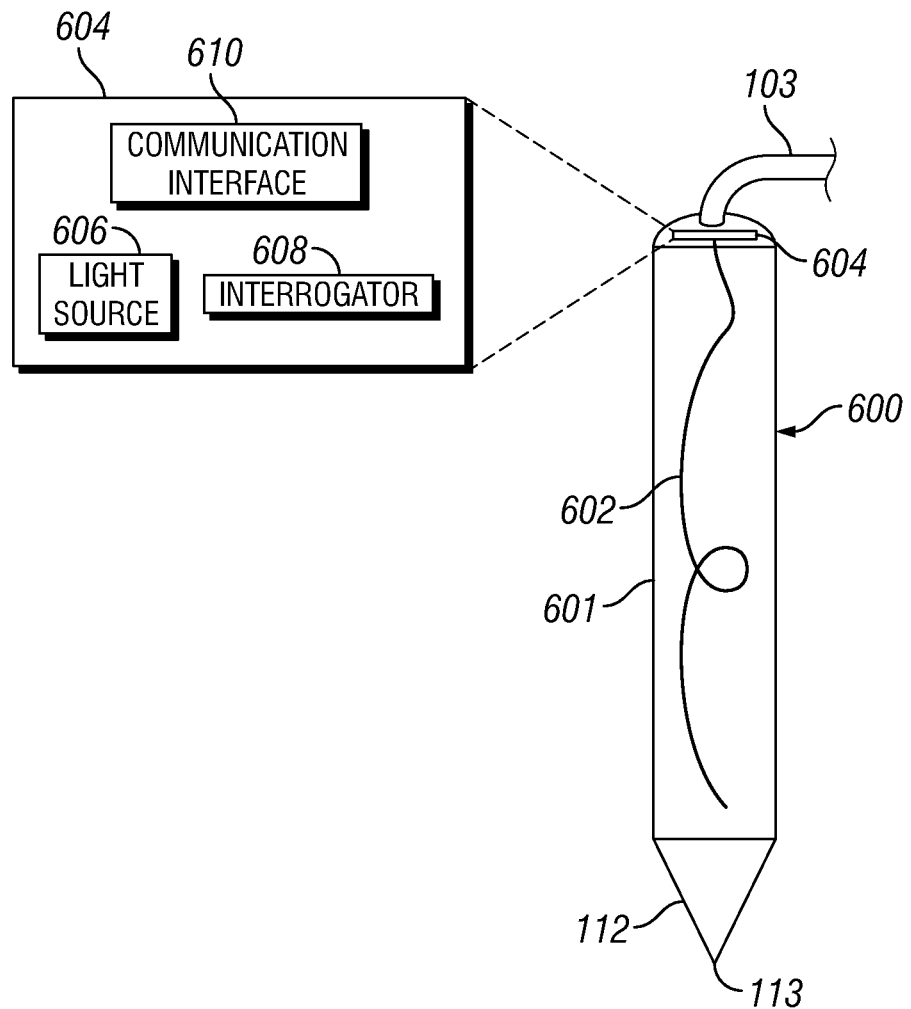
FIG. 6 is a schematic diagram of a sensor device according to other implementations.

FIG. 6 shows a sensor device 600 according to further implementations. Instead of including discrete sensor components as provided in the sensor devices 100, 300, and 400 discussed above, a distributed sensing device 602 is used instead. The distributed sensing device 602 is contained within an elongated housing 601 of the sensor device 600. The distributed sensing device 602 is a continuous sensor that measures translational data continuously along a length of the continuous sensor. In some implementations, the distributed sensing device 602 includes an optical fiber in which optical signals (light) can propagate.

The sensor device 600 includes an optical control arrangement 604 that includes a light source 606 and an interrogator 608. The light source 606 emits light (e.g., laser light) into the optical fiber. Backscattered light responsive to the emitted light is received by the interrogator 608. The presence of seismic signals and other signals (e.g., noise signals and other perturbations) affect at least one characteristic (e.g., strain) of each point along the optical fiber. This changed characteristic affects the backscattered light that is received by the interrogator 608.

The continuous measurements (including measured translational data) at various points along the optical fiber can be communicated by a communication interface 610 (which is part of the control arrangement 604) over the communication medium 103. The measured optical signals (as acquired by the interrogator 608) can be communicated as optical signals over the communication medium. In other examples, the measured optical signals can be converted into electrical format for communication as electrical signals over the communication medium 103.

A gradient can be computed based on respective differences of corresponding plural pairs of the measurements, in similar fashion as described above in connection with Eqs. 9 and 11. One or more of rotation data and divergence data can be computed using the gradient.

The computation of the gradient can be performed by a processor in the control arrangement 604, in some implementations. In other implementations, the gradient is computed by a computer system that is remotely located from the sensor device.

Figure 7:
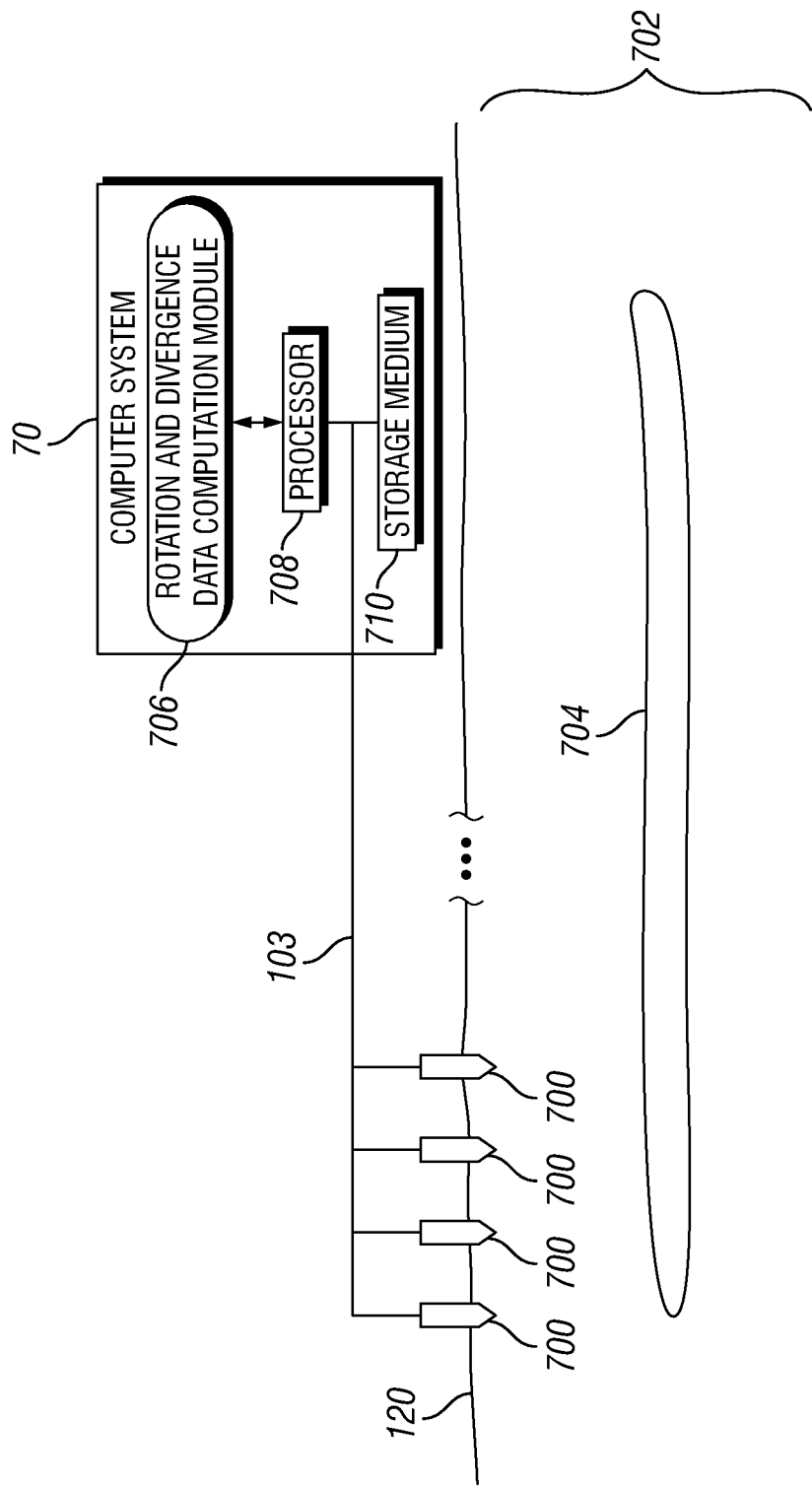
FIG. 7 is a schematic diagram of an example survey arrangement including sensor devices according to some implementations.

FIG. 7 is a schematic diagram of a land-based survey arrangement (including a seismic sensor system) that includes sensor devices 700 (e.g., 100, 300, 400, or 600) according to some implementations. In different examples, the sensor devices 700 can be deployed in a marine survey arrangement.

Measurements acquired by the sensor devices 700 are transmitted to a computer system 701, where the measurements are recorded (stored in a storage medium or storage media 710). In some examples, each sensor device 700 (or at least one of the sensor devices 700) can include the computer system 701, or at least one or more processors 708 and storage medium (or storage media) 710. The measurements are made by the sensor devices 700 in response to seismic waves produced by one or more seismic sources (not shown). The seismic waves are propagated into a subterranean structure 702, and reflected from a subterranean element 704 of interest. The reflected waves are detected by the sensor devices 700.

The computer system 701 includes a rotation and divergence data computation module 706, which can be implemented with machine-readable instructions that are executable on one or more processors 708. A processor can include a microprocessor, microcontroller, processor module or subsystem, programmable integrated circuit, programmable gate array, or another control or computing device. The rotation and divergence data computation module 706 can compute rotation data and divergence data as discussed above.

The processor(s) 708 can be coupled to the storage medium (or storage media) 710, which can store data, such as translational data received from the sensor devices 700.

The storage medium (or storage media) 710 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A seismic sensor system comprising:
a seismic sensor device comprising:
an elongated housing for placement at an earth surface;
a plurality of particle motion sensors contained in the elongated housing to measure translational data in a first direction while the elongated housing is placed at the earth surface, the plurality of particle motion sensors comprising plural pairs of particle motion sensors, wherein the particle motion sensors of each pair of the plural pairs of particle motion sensors are spaced apart along a second, different direction along a longitudinal axis of the elongated housing; and
at least one processor configured to compute a gradient based on respective differences of the measured translational data of the corresponding plural pairs of the particle motion sensors, and compute one or more of rotation data and divergence data using the gradient, the respective differences of the measured translational data comprising a first difference of the measured translational data of a first pair of the plural pairs of particle motion sensors, and a second difference of the measured translational data of a second pair of the plural pairs of particle motion sensors.

2. The seismic sensor system of claim 1, wherein a first spacing along the longitudinal axis between the particle motion sensors of the first pair is different from a second spacing along the longitudinal axis between the particle motion sensors of the second pair.

3. The seismic sensor system of claim 1, wherein the first pair is spaced apart from the second pair along the first direction, wherein the particle motion sensors of the first pair are spaced apart along the longitudinal axis, and wherein the particle motion sensors of the second pair are spaced apart along the longitudinal axis.

4. The seismic sensor system of claim 3, wherein the particle motion sensors of the first pair are spaced apart along the longitudinal axis by a first distance, and wherein the particle motion sensors of the second pair are spaced apart along the longitudinal axis by the first distance.

5. The seismic sensor system of claim 1, wherein the at least one processor is configured to compute a first gradient from the measured translational data of the first pair of particle motion sensors, and a second gradient from the measured translational data of the second pair of particle motion sensors, and wherein the gradient is an aggregate of the first and second gradients.

6. The seismic sensor system of claim 1, wherein the at least one processor is included in the seismic sensor device.

7. The seismic sensor system of claim 1, wherein the at least one processor is part of a computer system remotely located from the seismic sensor device.

8. A system comprising:
a seismic sensor device comprising:
an elongated housing for placement at least partially into an earth surface;
a distributed sensor in the housing, the distributed sensor to provide continuous measurements of translational data along a length of the distributed sensor; and
at least one processor configured to compute a gradient based on respective differences of corresponding plural pairs of the measurements, and compute one or more of rotation data and divergence data using the gradient, the respective differences of the corresponding plural pairs of the measurements comprising a first difference of the measurements at a first pair of points along the length of the distributed sensor, and a second difference of the measurements at a second pair of points along the length of the distributed sensor.

9. The system of claim 8, wherein the distributed sensor comprises an optical fiber.

10. A method comprising:
actuating a seismic source to transmit impulses into an earth subsurface;
receiving, by a system from a seismic sensor device, translational data in a first direction measured by plural pairs of particle motion sensors contained in an elongated housing of the seismic sensor device placed at a ground surface, the particle motion sensors in each pair of the plural pairs spaced apart along a second, different direction along a longitudinal axis of the elongated housing;
computing, by the system, a gradient based on respective differences of the translational data of the corresponding plural pairs of particle motion sensors, the respective differences of the translational data comprising a first difference of the translational data of a first pair of the plural pairs of particle motion sensors, and a second difference of the translational data of a second pair of the plural pairs of particle motion sensors; and
computing, by the system, a rotation data using the gradient.

11. The method of claim 10, wherein a first spacing along the longitudinal axis between the particle motion sensors of the first pair is different from a second spacing along the longitudinal axis between the particle motion sensors of the second pair.

12. The method of claim 10, wherein the first pair is spaced apart from the second pair along the first direction, wherein the particle motion sensors of the first pair are spaced apart along the longitudinal axis, and wherein the particle motion sensors of the second pair are spaced apart along the longitudinal axis.

13. The method of claim 12, wherein the particle motion sensors of the first pair are spaced apart along the longitudinal axis by a first distance, and wherein the particle motion sensors of the second pair are spaced apart along the longitudinal axis by the first distance.

14. The method of claim 10, further comprising computing a first gradient from the translational data of the first pair of particle motion sensors, and a second gradient from the translational data of the second pair of particle motion sensors, and wherein the gradient is an aggregate of the first and second gradients.

15. The method of claim 10, wherein the plural pairs includes at least four particle motion sensors, and wherein the least four pairs of the at least four particle motion sensors are useable to compute at least four respective estimated gradients, wherein the gradient of the translational data is an aggregate of the estimated gradients.

16. An article comprising at least one non-transitory computer-readable storage medium storing instructions that upon execution cause a computer system to:
receive, from a seismic sensor system placed at least partially into an earth surface, translational data in a first direction measured by a plurality of particle motion sensors contained in an elongated housing of a seismic sensor device placed at the earth surface, the seismic sensor device being part of the seismic sensor system, the plurality of particle motion sensors comprising plural pairs of particle motion sensors, wherein the particle motion sensors of each pair of the plural pairs of particle motion sensors are spaced apart along a second, different direction along a longitudinal axis of the elongated housing;
compute a gradient based on respective differences of the translational data measured by the corresponding plural pairs of particle motions sensors contained in the elongated housing of the seismic sensor device placed at the earth surface, the respective differences of the translational data comprising a first difference of the translational data of a first pair of the plural pairs of particle motion sensors, and a second difference of the translational data of a second pair of the plural pairs of particle motion sensors; and
compute one or more of rotation data and divergence data using the gradient.

17. The article of claim 16, wherein the first direction is a horizontal direction, and the second direction is a vertical direction.

18. The article of claim 16, wherein the first pair is spaced apart from the second pair along the first direction, wherein the particle motion sensors of the first pair are spaced apart along the longitudinal axis by a first distance, and wherein the particle motion sensors of the second pair are spaced apart along the longitudinal axis by the first distance.

19. The article of claim 16, wherein the computer system is part of the seismic sensor device.

* * * * *